July 6, 1943. L. ADAMS 2,323,439
METHOD AND MEANS FOR PRECOOLING CONTENTS OF REFRIGERATING CARS
Filed June 28, 1941 2 Sheets-Sheet 1

Inventor
Loyd Adams
By Lyon & Lyon
Attorneys

July 6, 1943.  L. ADAMS  2,323,439
METHOD AND MEANS FOR PRECOOLING CONTENTS OF REFRIGERATING CARS
Filed June 28, 1941  2 Sheets-Sheet 2

Inventor
Loyd Adams
By Lyon & Lyon
Attorneys

Patented July 6, 1943

2,323,439

UNITED STATES PATENT OFFICE 2,323,439

METHOD AND MEANS FOR PRECOOLING CONTENTS OF REFRIGERATING CARS

Loyd Adams, Maywood, Calif., assignor to Calavo Growers of California, Los Angeles, Calif., a corporation of California Application June 28, 1941, Serial No. 400,176

5 Claims. (Cl. 62—102)

This invention relates to a method and means for precooling the contents of refrigerating cars and has more particularly to do with the method and means of precooling the contents of refrigerated cars or the like for the controlled maturing and preservation of fresh fruits, vegetables, and the like.

In the transportation of fresh vegetables and fruit it is essential, if the same is to reach the distant markets in a proper condition, that the temperature at which the fresh fruits and vegetables are transported be maintained in most cases within rather close limits. This is true of citrus fruits, dates, oranges, many of the vegetables, cantaloupes and avocados.

For example, in the transportation of oranges, the fruit should be maintained at temperatures between 34° and 38° F., or thereabout; limes between temperatures of approximately 45° and 50° F.; and other fruits and vegetables within temperature ranges which are now well established in the art.

In the handling of avocados or, as the fruit is sometimes called, alligator pears, close temperature control is required. This particular fruit is not conditioned on the tree to where it is edible. As picked from the tree the pulp or flesh of the fruit is hard and it is matured (by which is meant conditioning it to where it is in the most edible condition) by maintaining the same under certain known temperature conditions. The rate of this maturing of fruit pulp or flesh softening is controlled by maintaining the fruit under determined temperature conditions. Maturing of the fruit is controlled in the case of the different varieties under slightly different temperature ranges. For example, the "Fuerte" and "Puebla" varieties when maintained at temperatures of around 39° to 40° F. are retarded from maturing or the softening of the flesh is substantially arrested. In the case of other varieties, the temperature conditions to arrest maturity are slightly higher in some cases and slightly lower in other cases. In the case of the "Nabal" variety, the temperatures required for arresting maturity and for proper preservation of the fruit are, for example, between 40° and 42° F.

In many cases of controlled temperature in transportation of fruit or vegetables, it is well recognized that freshing of the fruit or vegetables results in spoilage. It is also well recognized that if fruit or vegetables are maintained for any length of time at elevated temperatures, that the rate of maturity, as in the case of avocados, is too rapid and in other cases spoilage immediately starts.

The exacting conditions under which the fruit and vegetable is required to be maintained during transportation has heretofore produced a very difficult problem, particularly where the point of growing is far removed from the ultimate market.

In this application applicant will give as a particular example the controlled temperature transportation of avocados, although it is understood that the method and means for precooling the contents of refrigerating cars as herein set forth is not limited in its application to the handling of avocados.

As soon as this fruit is picked, it must be subjected to controlled temperature storage and removal of the fruit from this controlled temperature storage results in quite rapid maturing of the fruit. It has therefore been found that if the fruit is placed in refrigerator cars, the temperature of which is not properly controlled, the fruit will either mature too rapidly or will spoil before the same can reach the market for which it is destined.

It is therefore an object of this invention to provide a method and means of handling avocados to insure control of the rate of maturity.

Another object of this invention is to provide a method of precooling avocados in a refrigerator car rapidly and to the controlled temperature required and in such manner that the rate of maturity of the fruit during its transportation from the point of loading to the market may be controlled so that the fruit upon reaching the market will be in a state of maturity required for the proper sale and distribution.

Another object of this invention is to provide a means of precooling the load within a refrigerator car wherein the temperature to which the load is to be reduced may be controlled independently of the refrigerating means normally employed in such a car to enable the avocados as loaded to be maintained at the temperature required for the controlling of the maturity independently of the refrigeration used in such car for maintaining substantially that temperature necessary for storage of the fruit during transportation.

Other objects and advantages of this invention it is believed will be apparent from the following detailed description of a preferred embodiment thereof as illustrated in the accompanying drawings, in which Figure 1 is a side elevation of a refrigerator car diagrammatically illustrating the method of precooling a load of avocados therein.

Figure 1:
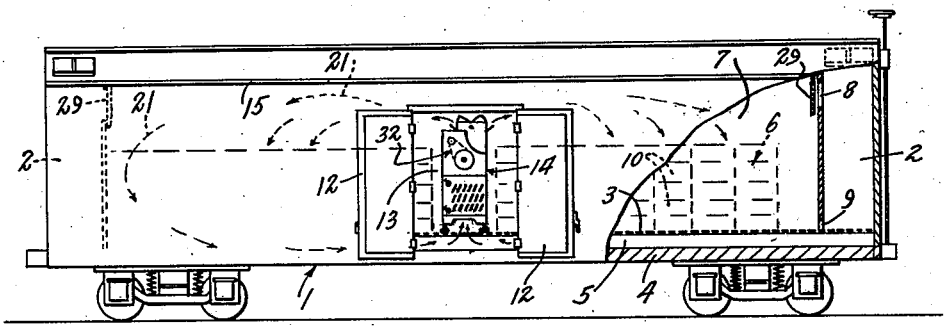
Figure 2:
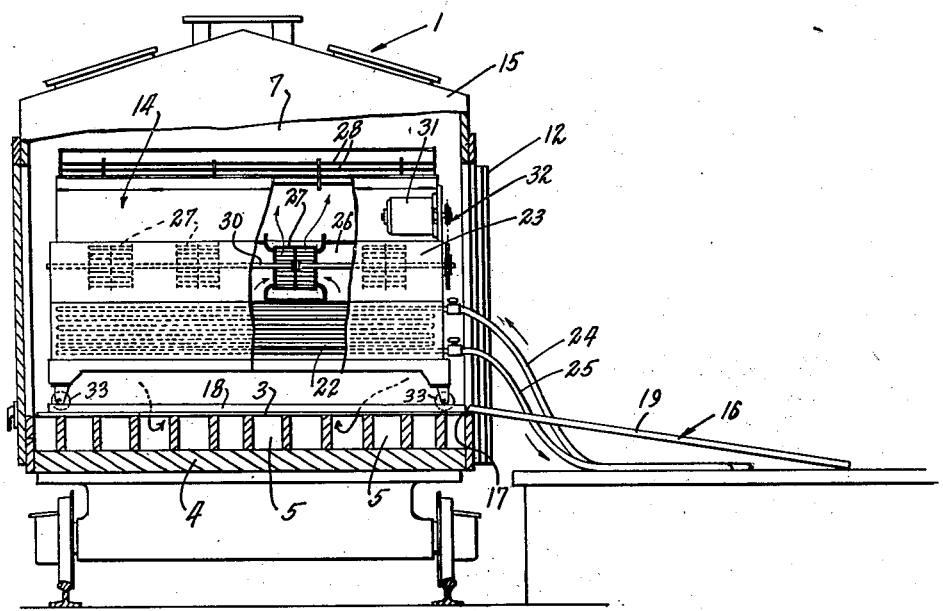
Figure 2 is an end sectional view of the car of Figure 1 illustrating the temperature controlled unit embodying my invention in partial vertical section.
Figure 4:
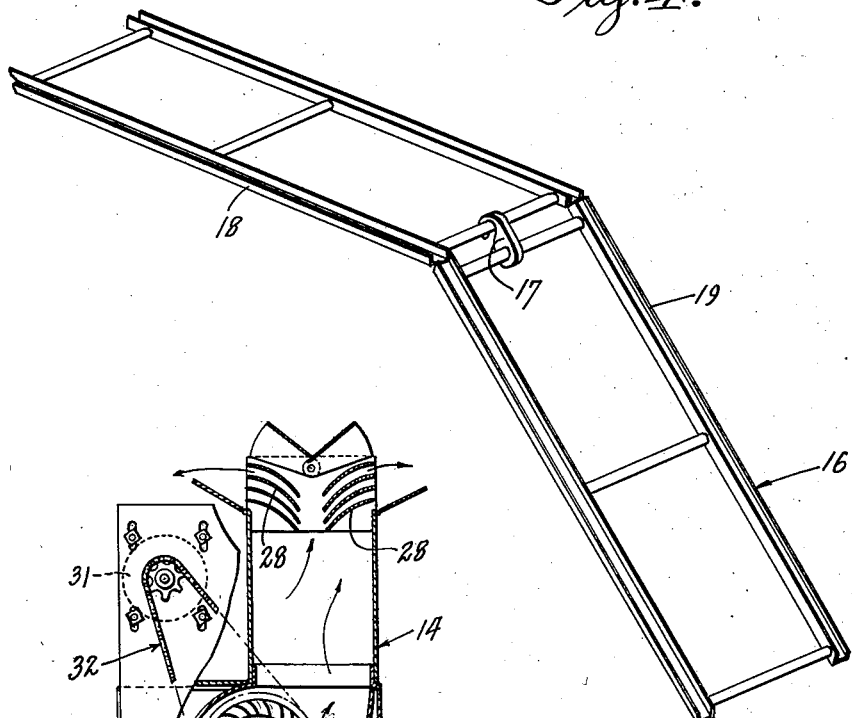
Figure 4 is a perspective view of the track means embodied in my invention for positioning the refrigeration unit within the refrigeration space in the refrigerator car.
Figure 3:
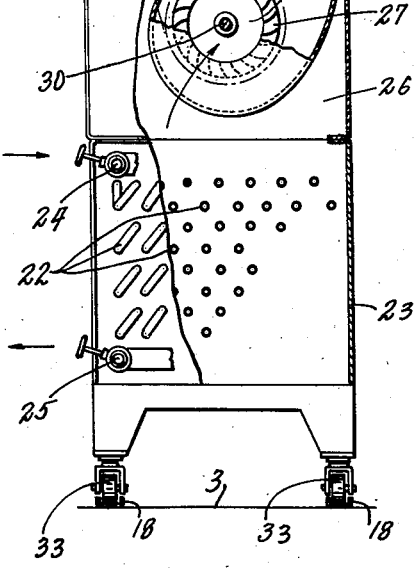
Figure 3 is an enlarged sectional end elevation of the refrigeration unit embodying my invention.

In the preferred embodiment of my invention illustrated in the accompanying drawings, I indicates a refrigerator car which may be of any suitable or desirable construction as is well understood in the art and which normally has refrigeration or ice bunkers 2 at its opposed ends and is likewise provided with a false floor 3 above the base floor 4 providing a circulation passage 5. The false floor 3 is ordinarily of slat, or open, construction permitting air circulation from the load 6 down through the floor. The bunkers 2 are ordinarily opened to the refrigeration space 7 within the car through the medium of upper and lower outlets 8 and 9 through which air circulates over ice or other refrigerating media placed within the bunkers 2. The ice or refrigeration medium ordinarily employed within the bunkers 2 is of a temperature materially lower than that desired for the proper storage of avocados. If avocados are maintained in freezing temperatures for a material length of time the fruit will spoil.

In accordance with my invention, the crates 10 containing the avocados are stacked within the refrigeration space 7 to leave at the center of the car adjacent the doors 12 a space 13 for the reception of the precooling unit 14. The load 6 is also stacked within the refrigeration space 7, leaving clearance between the load 6 and the roof 15 of the car 1. This method of stacking or loading the refrigerator car 1 is employed with reference to many different types of produce and is not per se my invention.

In carrying out my invention, the precooling unit 14 is moved into the space 13 on tracks 16 composed of two track sections hingedly connected together as indicated at 17 to permit one portion 18 of the track to lie flat upon the false floor 3 while the other section 19 extends therefrom to the platform or other loading space exterior of the car 1.

The precooling unit 14 of my invention is a controlled temperature precooling unit and is such as to circulate air at the controlled temperature within the refrigeration space 7 in substantially the directions indicated by the arrows 21 in order to reduce the temperature of the load 6 and the interior component portions of the car 1 to a temperature dictated by the requirements of the particular fruit or vegetable being handled and dependent upon the distance of travel of the car 1 and the desired degree of maturity at which the said fruit or vegetables are required to reach the said market. In the particular case of "Fuerte" and "Puebla" variety of avocados, maintaining the temperature of 39° to 40° F. substantially inhibits maturing of this fruit, so that by slightly raising the temperature above this point, which will ordinarily occur during transportation, when the fruit has been thus retarded from maturing at the start of the loading, it has been found that the fruit will reach the market at the degree of maturity required for proper distribution.

In order to accomplish this result, the precooling unit 14, as it is supported in the central aisle 13, provides a forced rapid circulation of air cooled to the required temperature, to quickly bring the temperature of the load 6 and the interior components of the car to the said reduced temperature. In order to thus rapidly precool the load, the precooling unit includes a circulation coil 22 contained within the housing 23 of the unit and over which the air subject to the forced circulation is drawn. The coil 22 is supplied with refrigerant through an inlet conduit 24 leading from a suitable source of refrigerant and the refrigerant is taken from the coils 22 through the return conduit 25.

It is also essential in the proper maturity control of fruit of this character that the air as circulated be not reduced in temperature below the said semi-critical range of temperature determined by the fruit or vegetables making up the load. To use air reduced to a lower temperature than this would result in refrigerating the load to too low a degree with the possible result that the fruit would spoil.

The air is drawn up through the bottom of the housing 23 over the coil 22 through the circulation ducts 26 through a series of fans 27 and is forced out through the vanes 28 in opposed directions longitudinally of the refrigerating space 7, or transverse to the aisle 13. Thus the circulation is continuously effected toward each end of the car 1 and the precooling is independent of any cooling effect from refrigerant contained in the bunkers 2. In fact, I prefer to close the control vanes 29 leading to the bunkers 2 and to maintain the air circulation solely within the refrigeration space 7 during the precooling operation which permits me at the same time to load the bunkers 2 with ice or other refrigerant without melting the ice due to the forced circulation of air or without danger of reducing the temperature of air to a degree below that desired.

By the method of circulation as hereinabove defined from the center mounted precooling unit outward toward the ends of the car and from the upper regions of the space carrying the load, the cold air as thus circulated filters down through the load in the direction of the arrows 21 as the cold air tends to fall. This results in a very finely controlled reduction of the temperature of the load without requiring high pressure air circulation. The air circulated in a given example is approximately at the rate of 10,000 cubic feet per minute under a very low pressure. Thus a large volume of air is circulated under low pressure in such manner as to avoid reduction of the moisture content of the fruit or vegetables being precooled and it is preferable that the air circulated be of relatively high humidity. It is of course understood that the load in the cars is not a solid load, but that the boxes or crates of fruit or vegetables are so positioned in the load as to permit the air as circulated to fall slowly through the load.

The fans 27 are mounted upon a shaft 30 and are driven from any suitable source such as a motor 31 through suitable transmission connections 32. The fans 27 and the directional vanes 29 extend transversely substantially the full width of the refrigeration space 7 and are operated at comparatively high speed to produce a forced air draft circulation so that the rate of heat exchange from the load 6 to the air is at a comparatively high rate to effect a very rapid precooling of the fruit. In this manner the fruit is brought to the desired temperature very quickly so as to inhibit the maturing process.

When the fruit has been brought to the correct temperature, as by this method of precooling, I have found that the ordinary circulation of air over ice or other types of refrigerant maintained in the bunkers 2 will more readily maintain the fruit at, or substantially at, this optimum temperature during long hauls so that maturing of the fruit does not occur too rapidly and so that the fruit will reach the market in a proper condition.

In order to permit of rapid precooling of the cars as they are loaded, the precooling unit 14 is mounted upon rollers 33 adapted to ride in the track 16, thereby permitting the unit to be quickly positioned in, and withdrawn from, the aisle 13.

Having fully described my invention, it is to be understood that I do not wish to be limited to the details herein set forth, but my invention is of the full scope of the appended claims.

I claim:

1. In an apparatus for precooling the load of a refrigerator car having a refrigerating space extending longitudinally of the car and having a centrally disposed aisle, of a precooling unit, means for supporting the precooling unit in the aisle in a direction transverse of the length of the car, cooling coils in the precooling unit extending substantially the length of the central aisle, means for circulating a cooling medium through the coils, means for drawing air up through the coils, and means for forcing the air under low pressure outwardly from the precooling unit toward the opposed ends of the refrigerating space so that the cold air may fall through a load in the refrigerating space to return below the load to the said precooling unit.

2. In an apparatus for controlling the rate of maturing of avocados, including a refrigerated car having refrigerant bunkers, a refrigerating space, and means whereby air is circulated to the refrigerating space from the bunkers, of a precooling unit, means for supporting the precooling unit transversely of the refrigerating space in a substantially centrally disposed transverse aisle within a load in the refrigerating space, means for force circulating cooled air from said unit over and through the load in directions at substantially right angles to the said aisle and independent of air cooling from said bunkers, and means for circulating a refrigerating medium through the unit and for conducting air over said circulating means whereby the air is maintained at a temperature of approximately 37 to 40° F., and whereby the circulation of air at said temperature quickly precools the said avocado load to a temperature approximating the temperature of 39 to 40° F. substantially independent of the cooling effect from air circulation from the said bunkers.

3. In an apparatus for controlling the rate of maturing of avocados in a stacked load in a refrigerating car preparatory to transporation thereof, the combination of a refrigerating unit adapted to be positioned in an aisle centrally of and extending transversely with relation to the load, said refrigerating unit including a refrigerant coil, means for conducting a refrigerant to, through and from the refrigerating coil, means for drawing air up through the coil from below the stacked load for forcing the same out under forced draft over the load to return through the load to the region below the load, said circulating means including directional vane means extending for substantially the full width of the load within the car and including a multiplicity of fan members.

4. In a method of precooling a load within the load-carrying space in a car in which the load is divided centrally of the car to provide a central aisle transversely of the car and adjacent the car side door, which includes the steps of forcing the air from said central aisle and over the length of the aisle toward the opposed ends of the car through the load to return to the central aisle, extracting the heat from the air so circulated within the central aisle, and then recirculating the air from the central aisle.

5. In a method of precooling a load within the load-carrying space in a car in which the load is divided centrally of the car to provide a central aisle extending transversely of the car, the steps of forcing air from said central aisle over the full length of the central aisle toward the opposed ends of the car, said circulation extending through the load back to the central aisle, and extracting the heat picked up by the air from said air in the central aisle.

LOYD ADAMS.